AUTOMATIC GRADE AND SLOPE CONTROL APPARATUS
Original Filed Oct. 4, 1968 3 Sheets-Sheet 1
Fig. 1
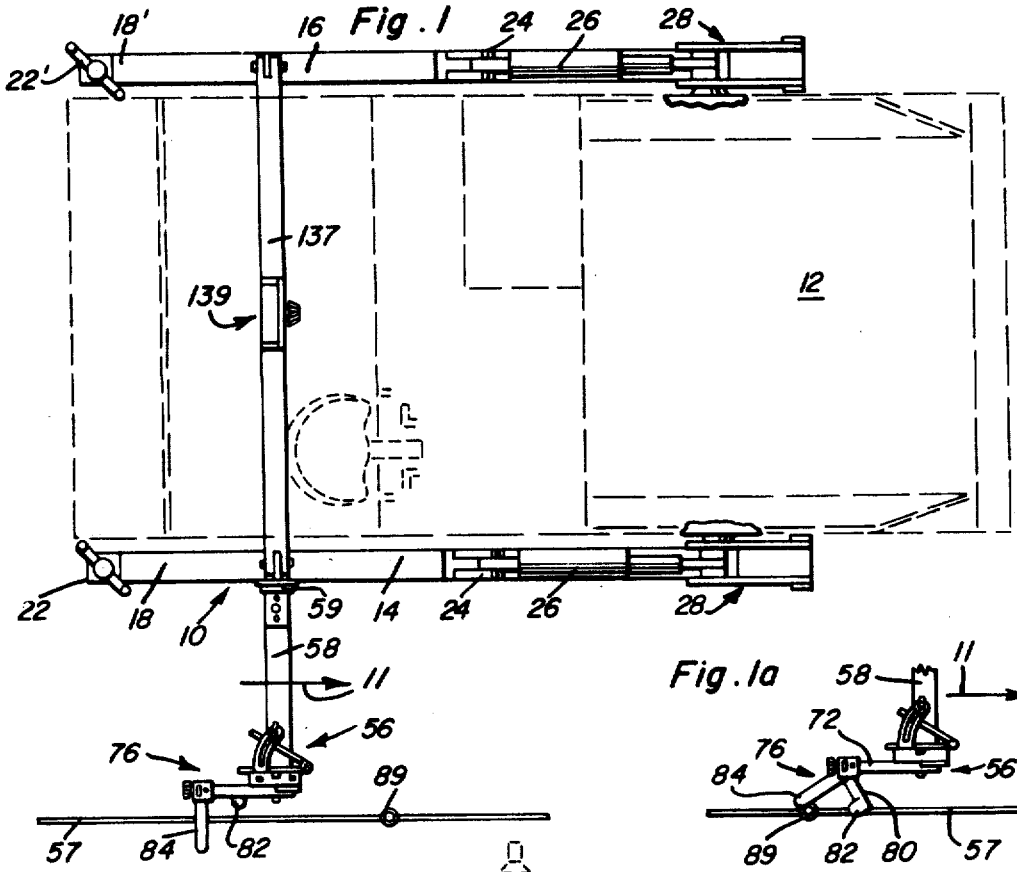
Fig. 1a
Fig. 2
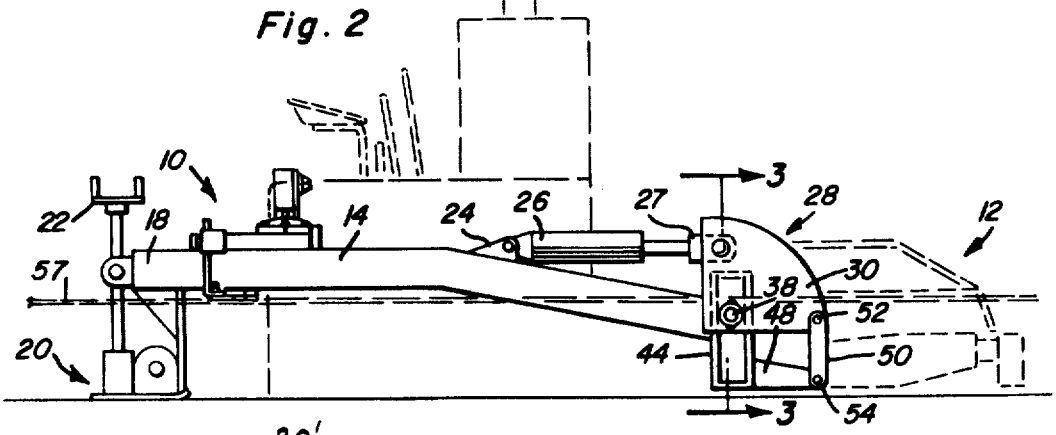
Fig. 3
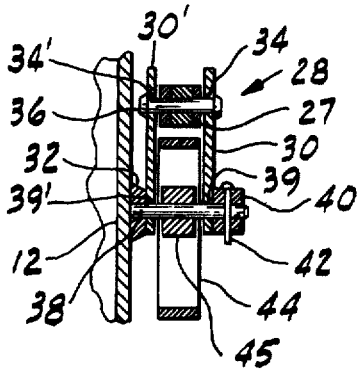

AUTOMATIC GRADE AND SLOPE CONTROL APPARATUS
Original Filed Oct. 4, 1968 3 Sheets-Sheet 2
Fig. 4
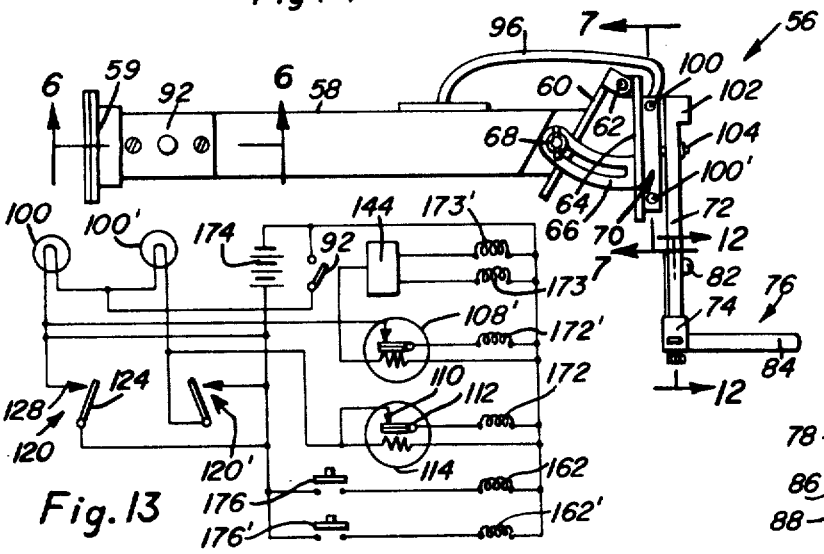
Fig. 13
Fig. 5
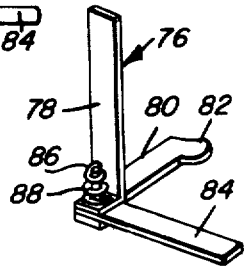
Fig. 6
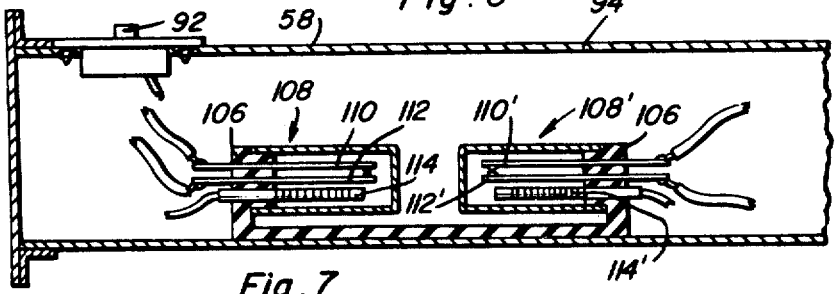
Fig. 7
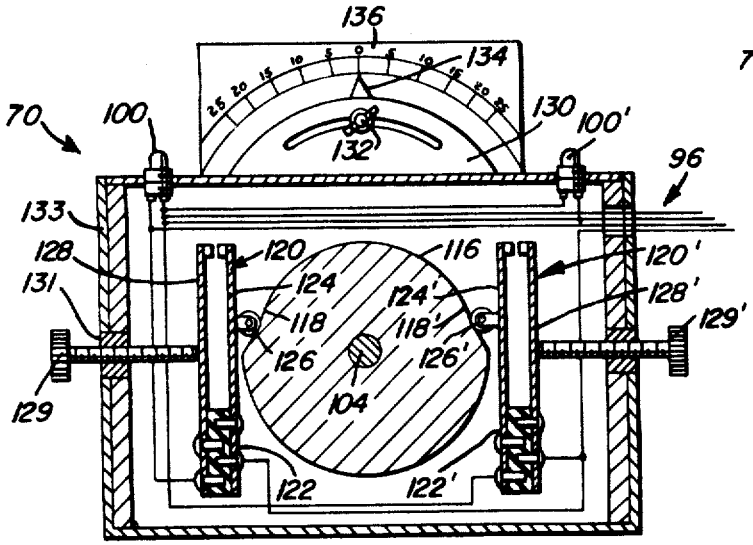
Fig. 12
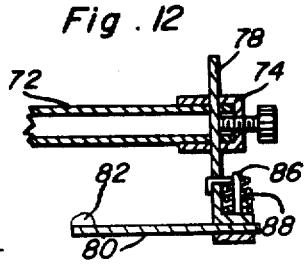

AUTOMATIC GRADE AND SLOPE CONTROL APPARATUS

Original Filed Oct. 4, 1968 3 Sheets-Sheet 3

United States Patent

Re. 28,400
Reissued Apr. 29, 1975

28,400

AUTOMATIC GRADE AND SLOPE CONTROL APPARATUS

Luther B. Burgin, P.O. Box 958, Poplar Bluff, Mo. 63901

Original No. 3,564,986, dated Feb. 23, 1971, Ser. No. 765,174, Oct. 4, 1968. Application for reissue Feb. 21, 1973, Ser. No. 334,433

Int. Cl. E01c *19/00*

U.S. Cl. 404—84 24 Claims

Matter enclosed in heavy brackets [ ] appears in the original patent but forms no part of this reissue specification; matter printed in italics indicates the additions made by reissue.

ABSTRACT OF THE DISCLOSURE

[A paving machine having a screed control system with individually actuated leveling arms controlled by electrical control means for sensing deviations in road slope and grade from preset levels. Deviations generate error signals which energize the control circuitry for maintaining the screed at the preselected levels by movement of the leveling arms.]

*A paving machine having a screed carried by leveling arms and an automatic control system for maintaining the screed at a preset grade and slope, with changes in grade being sensed by a grade control having a grade line follower which rides along on a grade line string stretched taut on grade rods, the follower being rotatable about a vertical axis upon engagement with a grade rod as the paver moves forwardly thereby to permit the follower to swing clear of the grade rod, and with changes in slope being sensed by a gravity-operated slope sensor. Each leveling arm is positioned by means of a hydraulic cylinder and linkage assembly whereby a signal from either the grade control or the slope sensor affects actuation of an appropriate hydraulic cylinder and linkage assembly thereby to maintain the road surface being formed at a desired grade and slope.*

The present invention relates to a grade and slope control system for bituminous pavers *and other types of road-making machines and construction equipment.*

Bituminous pavers for road construction have been constructed to include a screed member positioned by hydraulically actuated [level] *leveling* arms to retain a preselected grade *and slope.* Prior-art pavers of this type include sensors which detect variations in screed position relative to the desired grade and slope of a road being paved, *these sensors generating a signal in response to detecting a grade or slope variation and effecting movement of the leveling arms thereby to reposition the screed so as to maintain the surface of the paving at its desired slope and grade.* Generally, previous devices have included large pivot connectors for allowing the [level] *leveling* arms to change position. Further, prior-art devices have included grade and slope sensors which are prone to vibration thereby generating false error signals causing unintentional deviation of the screed from a preselected position.

The present invention includes a sensor unit utilized to control the grade angle of the screed. This sensing unit operates directly from the DC battery source of the paving machine thereby requiring no auxiliary generator or voltage regulator assembly for the operation thereof. The present sensing device is not affected by slight voltage changes, a problem encountered by prior-art apparatus. Also, the present sensor includes switch means capable of handling sufficiently large current to operate the [level] *leveling* arm controls without the inclusion of power relays or other components to amplify current thereto.

Several prior-art slope angle sensors utilize a pendulum-type mechanism which is mechanically linked to a potentiometer. The present sensing device obviates the problems previously encountered with such potentiometer constructions which have proven to be prone to wear and rapid mechanical deterioration. Further, the present sensing device is unaffected by atmospheric changes, moisture or vibration. Still further, the slope angle sensing device achieves excellent damping without loss of sensitivity.

The present invention [utilizes the] *is particularly useful when a grade* string line [principle] *is used as a grade reference* for controlling relative changes in position of the screed to obtain a desired grade and includes several equipment improvements in this respect. The invention includes a gradeline follower having a mechanism for permitting the same to easily move past marker stakes as well as insuring the positioning of the follower along the top of the string line.

The present invention further includes a novel pivot assembly for the leveling arms which is more compact than previously conceived assemblies. Further, the pivot assembly permits more rapid response and followup to actuating inputs.

These together with other objects and advantages which will become subseqently apparent reside in the details of construction and operation as more fully hereinafter described and claimed, reference being had to the accompanying drawings forming a part hereof, wherein like numerals refer to like parts throughout, and in which:

FIG. 1 is a top plan view of the present screed control apparatus shown in relation to a paving machine frame.

FIG. 1a is a top plan view of a portion of the paving control apparatus in a gradeline rod transition position.

FIG. 2 is a side elevational view of the apparatus shown in FIG. 1.

FIG. 3 is a partial transverse sectional view taken along a plane passing through section line 3—3 of FIG. 2.

FIG. 4 is a top plan view showing the grade-following assembly.

FIG. 5 is a perspective view illustrating the string line follower of the assembly shown in FIG. 4.

FIG. 6 is a sectional view taken along a plane passing through section line 6—6 of FIG. 4 illustrating electrical components associated with the aforementinoed grade-following assembly.

FIG. 7 is a transverse sectional view taken along a plane passing through section line 7—7 of FIG. 4.

FIG. 12 is an enlarged partial sectional view through a plane indicated by section line 12—12 in FIG. 4.

FIG. 13 is an electrical circuit diagram corresponding to the grade and slope control system of the present invention.

Figure 10:
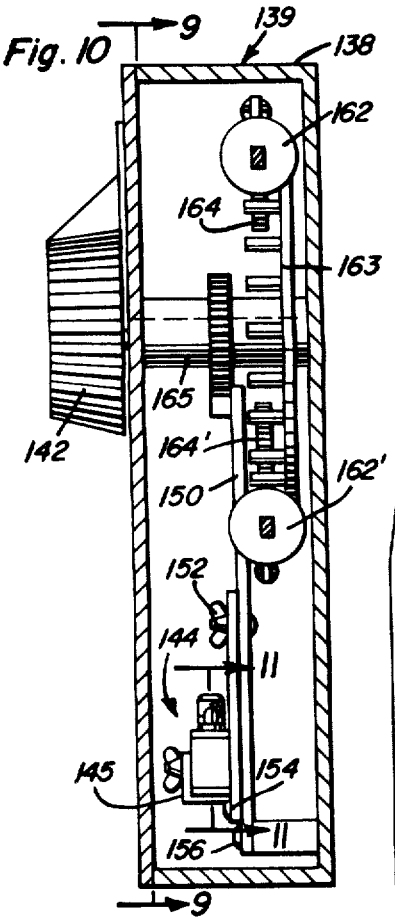
FIG. 10 is a transverse sectional view of the slope-detecting mechanism of FIG. 9 taken along a plane passing through section line 10—10 of FIG. 9.

Referring to the drawings and [H.A.] *more* particularly to FIGS. 1 and 2 thereof, the entire screed control mechanism *or system* generally denoted by reference numeral 10 is mounted upon the frame of a typical road [finishing] -making machine or paver 12 moving in a direction indicated by arrows 11 in FIG. 1. The paver 12 is of a type such as shown in U.S. Pat. No. 3,054,334 issued to H. A. Barber et al. The screed control mechanism includes laterally positioned leveling arms 14 and 16 disposed in parallel spaced relation, each of said arms having aligned ends 18 and 18' from which *an element, such as* a screed assembly 20 depends. Associated with the screed assembly 20 are thickness and control screws 22 and 22' which are connected to the aforementioned leveling arm ends 18 and 18' in a well-known manner.

Referring to FIG. 2, the leveling arms 14 and 16 include two elongated portions forming an obtuse angle. A triangular mounting bracket 24 is attached to each of the leveling arm portions adjacent to the angle between the two portions. These brackets pivotally attach suitable hydraulic cylinders 26 and 26' at a first fixed end thereof. The piston end of each cylinder contains a generally [U-shpaed] *U-shaped* connector 27 which is pivotally connected to a linkage assembly 28. *Linkage assemblies 28 together with hydraulic cylinders 26 and 26' constitute means for connecting the leveling arms to the paving machine and power-operated means for positioning the element or screed so as to form a road surface at a desired slope and grade.*

Each assembly 28 is more particularly shown in detail in FIG. 3 wherein it will be observed that two plate *or lever,* members 30 and 30', disposed in spaced parallel relation, define a casing for the assembly. The laterally inward plate member 30' is spaced from an adjacent portion of frame 12 which mounts a perpendicularly outwardly extending shaft member 38. A spacing washer 32 is concentrically disposed on the shaft member, in juxtaposition with frame 12. Two axially disposed apertures 34 and 34' are formed within plate members 30 and 30' to receive a rivet 36 therethrough to which the piston rod is connected by connector 27 and which retains the plate members in fixed relation. A lower portion of both plate members include*s* aligned apertures 39 and 39' for [permitting passage of] *journalling the plates on* shaft member 38 [therethrough. The plate members are attached to the shaft member at the point of shaft member passage through the plates by suitable means such as welding or the like]. A second washer 40 is concentrically mounted upon the end portion of shaft member 38 in juxtaposition with the outward surface of plate member 30. The lattermentioned washer is retained in place by means of a cotter pin 42. A rectangular box frame assembly 44 having centrally disposed aligned slots within lateral wall portions thereof is positioned upon an intermediate portion of shaft member 38 between the plate members 30 and 30'. The slots within the box assembly permit sliding box motion with respect to shaft member 38. Angular motion of the box assembly upon the shaft member is facilitated by the inclusion of a roller 45 [between the coaxially spaced sides] *within the slot* of the box assembly. The transverse edges of the box assembly confronting the leveling arms 14 and 16 provide a mounting surface for connecting the leveling arms and box assembly. An extension 48 is secured to the box assembly through which it is connected to plate 30 and 30' by link 50 and link pins 52 and 54.

In operation of the pivot assembly 28, retraction of the hydraulic pistons causes rotational and sliding motion of the box assembly 44 with respect to the plate members 30 and 30' resulting in lowering of the screed. In a reverse manner, extension of the hydraulic piston causes raising of the leveling arms. Both hydraulic cylinders 26 may be operated in unison to obtain uniform vertical motion of the screed assembly 20 in response to grade changes. The control means for accomplishing these ends are explained hereinafter.

The means for accomplishing screed grade adjustment includes grade control mechanism 56 shown in FIGS. 1 and 1a which is adapted to be actuated by a grade follower 76 riding along a string line grade reference 57, set at a predetermined profile generally parallel to the direction of movement of the machine as shown by arrow 11. Any changes in the attitude of the paver in relation to the grade reference causes the leveling arm pivots to be raised or lowered by an amount necessary to maintain desired grade. The grade follower is mounted upon an outwardly extending tubular housing 58 having a square or rectangular cross section. The housing is attached at one end thereof to leveling arm 14 by means of a suitable angle iron 59. The oppositely disposed outward end of the housing is angularly truncated and mounts a bracket 60 thereon as more clearly seen in FIG. 4. One end 62 of the bracket is pivotally connected to a second bracket 64 by means of a pivot connection so that brackets 60 and 64 form an angularly adjustable support for detecting device 70. An adjustment plate 66 interconnects brackets 60 and 64, the adjustment plate having an arcuate slot therein. A wingnut assembly 68 mounted on the outward end of housing 58 permits the fastening of adjustment plate 66 by positioning the wingnut 68 along a predetermined point in the adjustment plate slot and fastening the same. The detecting device 70 is fixedly mounted on bracket 64. A lever arm 72 is pivotally connected to the detecting device 70. The lever arm 72 extends perpendicularly outwardly from housing 58 and terminates in a holder 74 into which is fastened the grade follower generally denoted by 76.

Referring to FIGS. 5 and 12, the particular structure of grade follower 76 includes a vertical arm 78 slidably secured within holder 74 in a vertically adjusted position and a perpendicularly oriented horizontal arm 80 having an upwardly inclined ear 82. A second horizontally disposed *contact* arm 84 is perpendicularly displaced from [plate] *arm* 80 and is adapted to ride over strong line 57 *on one side thereof, i.e. the top.* Arm 84 includes a mounting post 86 extending in spaced parallel relation to vertical arm 78, the post mounting a torsion spring 88 thereon. A first end of the torsion spring is attached to arm 84 and the opposite spring end is suitably attached to vertical arm 78 to yieldably hold the arms 80 and 84 in the position shown in FIG. 1, *thus biasing the contact arm for rotation about post 86 to a position in which it is engageable with the grade line string as the paver moves forwardly parallel to the grade line.*

In operation of the grade follower, horizontal arm 84 rides along the top of a grade string and at such time when the arm engages a marker stake rod 89, the torsion spring 88 permits the arm 84 to deflect laterally (*i.e., to rotate about the vertical axis of mounting post 86*) *and to pass clear of the grade rod* as shown in FIG. 1a. The ear projection 82 extending from [plate] *arm* 80 prevents the grade string from jumping above arm 84 moving therewith as the arm 84 passes the stake rod. *Thus, contact arm 80 and ear 82 constitute means for preventing contact arm 84 from moving to the opposite side of the grade line when the contact arm engages a grade rod and rotates about mounting post 86 clear of the grade rod.* Because of this arrangement, the grade string line need not be tacked to the top of the usual grade stakes as in prior-art arrangements. Instead, rods 89 are driven into the ground adjacent the usual grade stakes and the string line wrapped around the rod in a taut condition.

Referring to FIGS. 4 and 6, the electrical components associated with the grade sensing system [is] *are* shown to include a pushbutton switch 92 suitably mounted on the housing 58 by means of which indicator lamps 100 and 100' associated with detecting device 70[,] may be disconnected from the power source. An electrical cable 96 interconnects housing 58 with detecting device 70. Indicating lamps 100 and 100' are mounted upon detecting device 70 in a manner permitting easy sighting thereof from an elevated position. These lamps indicate the condition of the detector device with respect to the horizontal. As seen in FIG. 4, the lever arm 72 includes a rearward end thereof to which a counterweight 102 is attached. An intermediate length of the lever arm, at a point adjacent the counterweight, includes an aperture for receiving pivot shaft 104 which extends outwardly from the detecting device 70 to establish a *horizontal* pivotal axis transverse to the direction of movement [for the follower device 76] *of the paving machine. The counterweight counterbalances lever arm 72 on pivot shaft 104 so that with contact arms 80 or 84 in contact with grade string line 57 the contact arms apply a slight downward force on the grade string. Thus, as the paver moves forwardly and as the vertical distance between the pivot shaft 104 and the grade line string varies, the contact arms are biased to remain in engagement with the grade line string. The changes in vertical distance between the grade line string and the pivot axis cause the lever to rotate about the pivot axis.*

FIG. 6 shows the electrical components within housing 58 and is seen to include a nonconductive generally U-shaped bracket 106 for holding two oppositely disposed and confronting delay relays 108 and 108'. Relay 108 includes a first stationary contact 110 and a second movable contact 112 fabricated from a heat sensitive material which deflects upwardly to the contact 110 when subjected to heat from a heater element 114 located in underlying spaced relation to movable contact 112. The contact and heater components of relay 108' are identical to those of relay 108 and are denoted by primed numbers corresponding with those of relay 108. In FIG. 6, the contacts are shown in their energized or closed position. It will be understood that these contacts are normally open. In operation of the present invention, when detecting device 70 is actuated, a voltage is applied to cause energization of heater element 114 or 114' as hereinafter explained. After a predetermined length of time, the movable contact of the associated relay will deflect to cause relay closing which in turn completes an electrical circuit for energizing one or the other solenoid valve (not shown) that conventionally causes an associated leveling arm hydraulic cylinder to operate. *Thus, detecting device 70, including various electrical components, constitutes grade-signalling means actuated by grade follower 76 to energize the power-operated means (i.e., the hydraulic cylinder units 26 and linkage assemblies 28) thereby to change the position of the element or screed assembly 20 in response to vertical movement of the paving machine relative to the grade reference.*

The particular internal structure of detecting device 70 is illustrated in FIG. 7. As will be observed, previously mentioned pivot shaft 104 mounts a cam 116 generally characterized by two oppositely extending semicircular portions of differing diameters, *this cam being rotary in response to a change in position of element or screed assembly 20.* The cam portions joining the confronting ends of the semicircular portions produce oppositely disposed *cam surface* contours denoted by 118 and 118'. A contact assembly denoted by 120 is disposed adjacent contour 118 and is seen to include *elongate, flexible and resilient cantilevered switch* [contact being] *contact arms which are* anchored within a base mount 122. The assembly includes a movable contact *arm* 124 having a roller-type cam follower 126 attached thereto and adapted for sliding over contour 118. The second contact of the switch *or contact* assembly 120 includes a fixed contact *arm* 128 which is positionally adjusted by means of thumbscrew 129, received within a threaded insulative insert 131, the latter retained within device housing 133. The thumbscrew 129 has an elongated threaded shaft portion for contacting switch contact 128. The outward portion of the thumbscrew 129 includes an enlarged head permitting manual adjustment of the relative distance between switch contacts 124 and 128. *Contact arms 124 and 128 each have a respective electrical contact (i.e., contact means) at its outer end with the contact carried by arm 124 being movable therewith and with the contact carried by arm 128 being engageable by the contact on arm 124 as the latter moves in response to rotation of cam 116. As shown in FIG. 7, a second contact assembly 120' is provided on the opposite side of cam 116 adjacent cam surface contour 118' and is substantially identical to contact assembly 120.* Housing 133 is locked to bracket 64 shown in FIG. 4, in an angularly adjusted position through an angular indicator 130 secured to housing 133 along the top wall thereof. An arcuate slot is formed within plate member 130, the slot receiving a wingnut assembly 132 which is permanently fastened to the bracket 64. In order to indicate the angular position of device 70, a pointer projection 134 integrally attached to plate member 130 is positioned in adjacent relation with a graduated scale plate 136 which is fastened to bracket 64. By presetting the angular position of pointer 134, a machine operator may select any desired elevation above or below grade.

In operation of the device, *the contacts of both contact assemblies 120 and 120' are adjusted to be open and* movement of lever arm 72 causes rotation of cam 116, and should such displacement exceed a predetermined degree, one of the contact sets 120 or 120' is closed thus completing an electrical circuit through an associated lamp indicator 100 or 100'. Closing one set of switch contacts causes current to flow to an associated relay 108 or 108' through electrical cable 96. When the grade follower 76 is angularly displaced due to change in grade, cam 16 is caused to rotate thereby causing the closing of switch contacts 120', energization of associated indicator lamp 100' and commensurately causes energization of heater element 114'. As previously explained, energization of this heating element causes closing of relay contacts 110' and 112' after a predetermined time interval subsequently causing the uniform lowering or elevating of the screed-leveling arms in accordance with a change in grade. *Thumb screws 129 and 129' of each switch assembly 120, 120', respectively, constitute means for selectively adjusting the position of each contact arm 128, 128' relative to its respective movable contact arm 124, 124', thereby selectively to vary the angular position of cam 116 at which the contacts of each contact assembly 120 or 120' open and close thus to vary the sensitivity of detecting device 70 to detecting a change in position of the element or screed assembly 20.* As will be noted from FIG. 7, cam 116 is so constructed as to permit closing of only one set of switch contacts at a particular time. *With cam 116 so developed and phased and with screed assembly 20 in its desired grade, the contacts on both contact assemblies 120 and 120' are open, and, upon movement of the screed assembly from its desired position, rotation of cam 116 is effected and the contacts in one of the contact assemblies close while the contacts in the other contact assembly remain open thereby to generate a signal indicating a change in grade of the screed.*

Figure 9:
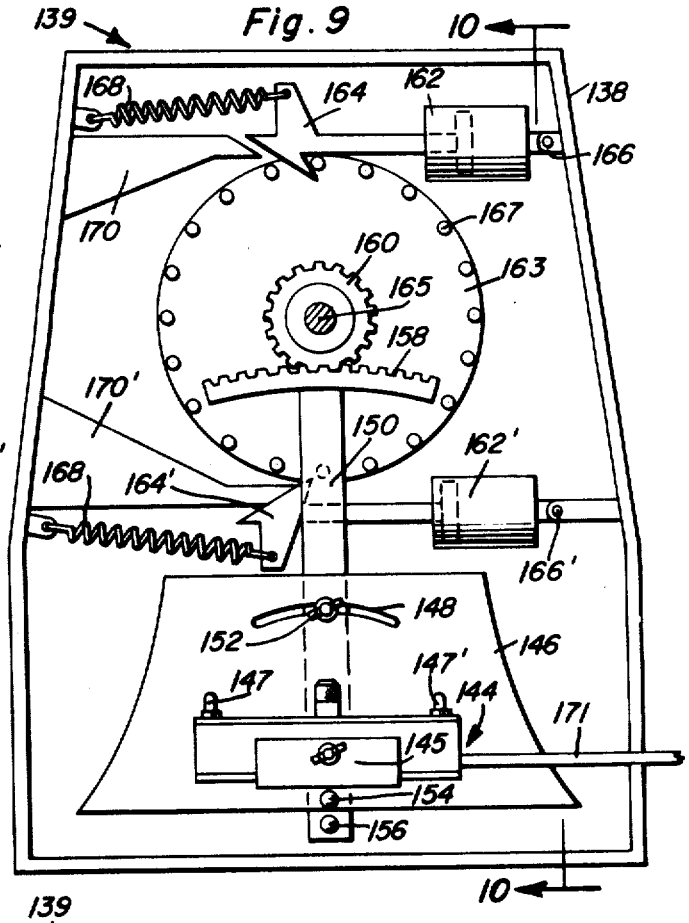
FIG. 9 is an enlarged front view of the slope-detecting assembly shown in FIG. 8, with the front cover thereof removed to illustrate the interior components.
Figure 8:
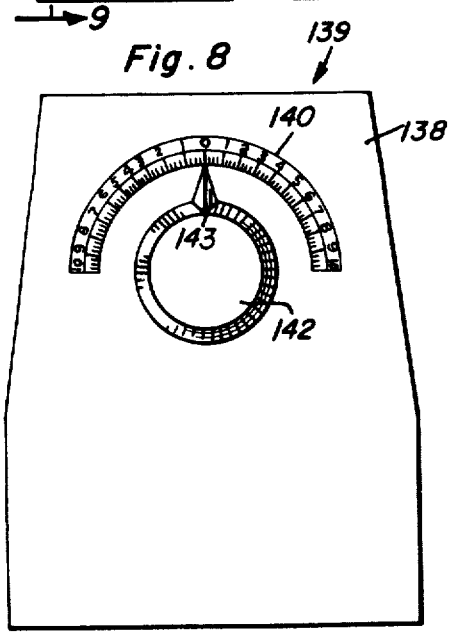
FIG. 8 is a front elevational view of a slope-sensing mechanism.
Figure 11:
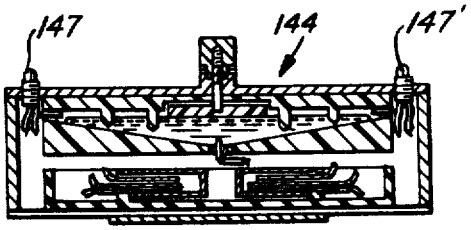
FIG. 11 is a transverse sectional view of a slope detector employed in the slope-detecting assembly of the present invention.

The means for regulating lateral slope of the screed includes an angle-detecting mechanism generally denoted by reference numeral 139, shown in FIGS. 8–10. The mechanism includes a housing 138 mounted upon a transverse beam 137 pivotally connected at the opposite ends thereof to the leveling arms 14 and 16 arranged to sense changes in slope of the screed and the pivotal axis of the follower device 76 mounted thereon. A rotatable knob 142 having a pointer portion 143 thereon may be angularly positioned with respect to scale 140 imprinted on the exterior of the housing. The components situated within the interior of housing 138 are shown in FIGS. 9 and 10. This particular mechanism requires a gravity-operated angle-sensing switch 144 such as disclosed in my copending application U.S. Ser. No. 659,284, filed July 24, 1967 (*now U.S. Pat. No. 3,564,531*). The internal structure of the sensing device is shown in FIG. 11 and encloses a conductive liquid adjustably damped to avoid oscillation and operative to establish a conductive path between contacts to energize thermal relays for delayed supply of energizing current to power cable 171. The device 144 thereby detects angular displacement from a horizontal position perpendicular to a gravitational vertical. Upon angular displacement of the sensing device indicator lamp 147 or 147' provides an indication of the direction in which displacement occurs. The voltage output from the sensing device through cable 171 is operative to change the position of leveling arm 16 relative to leveling arm 14 in order to maintain a predetermined lateral tilt of the screed (*and thus form the road surface at a desired slope*). *The grade-signalling means maintains the road surface at its desired grade.*

The sensing device 144 is mounted on a generally trapezoidal bracket 146 by means of a clamping bracket 145. The trapezoidal bracket 146 includes an arcuate slot 148 along an upward portion thereof for receiving a wingnut assembly 152, the wingnut assembly extending laterally outwardly from a generally vertically oriented arm 150. The lower end of the arm is pivotally connected by pin member 156 to housing 138. Bracket 146 is pivotally connected to arm 150 by means of a suitable fastener 154 so that it may be locked to arm 150 in an angularly adjusted position by wingnut 152. The upper end of arm 150 mounts an arcuate rack gear segment adapted to mesh with a pinion gear 160 concentrically disposed upon shaft 165, the outward end of the shaft being retained within knob 142. A circular disc 163 is concentrically fixed to shaft 165 and is axially spaced from pinion 160. The periphery of disc 163 is characterized by outwardly protruding ratchet projections 167 for purposes to be discussed hereinafter. By use of the knob 142 and the angularly graduated scale 140 a machine operator may vary the lateral slope maintained by the screed. This is accomplished by adjusting the knob attached shaft 165 to a preselected angle. This in turn causes rotation of rack and pinion 158 and 160 respectively. Rotation of the rack gear 158 angularly displaces the sensing device 144 which generates a signal to cause a change in the level of leveling arm 16.

Slope adjustment from a remote location such as from the control panel at the operator's station, is alternatively effected by signals applied to solenoid 162 pivotally mounted in the angular sensing assembly housing 138. The solenoid includes a pawl element 164 adapted to engage the lateral projections 167 on disc 163. Normally, an elongated spring 168 suitably attached between housing 138 and pawl element 164 causes outward displacement of pawl element 164 into engagement with a camming stop 170 causing the pawl to be held out of engagement with ratchet projections 167.

An identical solenoid-pawl arrangement is situated below the first-mentioned arrangement and is similarly numbered with primed numbers. Each solenoid mechanism is adapted to incrementally rotate disc 163 in clockwise or counterclockwise direction depending upon which of the solenoids is actuated in order to displace the sensing device 144 from an inactive position.

Operation of the automatic screed control system may be summarized by reference to FIG. 13. When a change in grade is sensed by the gradeline follower 76, one of the switches 120 and 120' of detecting device 70 is closed to complete a circuit through one of the heater elements in relays 108 and 108'. Thus, after a predetermined delay, one of the valve control solenoids 172 and 172' is energized from battery source 174 to effect either lowering or raising of the screed through the leveling arm 14 to a new level thereby restoring switch 120 or 120' to its normally open position. This change in the position of leveling arm 14 produces a change in lateral tilt of the screed which is sensed by sensing device 144 supplying a signal to valve control solenoid 173 or 173' to change the position of the leveling arm 16 in order to maintain a preset later slope. *Thus automatic grade and slope control is effected when one of the sets of solenoid valves is connected to the grade-signalling means and the other set is connected to slope sensor 144.* In order to change the slope from a remote location as aforementioned, signal pulses are supplied to solenoid 162 or 162' by momentary closing of the pushbutton switch 176 or 176' at the operator's station.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

I claim:

[1. In combination with a paving machine having a screed vertically positioned by leveling arms in accordance with changes in grade determined by a gradeline extending taut between grade rods substantially parallel to the direction of movement of the praving machine, a control system for varying the position of the screed in response to changes in grade and slope including power-operated means connected to the leveling arms for vertical and pivotal displacement of the screed, a follower device piovtally supported by at least one of the leveling arms about a pivotal axis transverse to the direction of movement of the paving machine for contact with the gradeline, and grade-signalling means for energizing the power-operated means in response to pivotal displacement of the follower device by the gradeline relative to the leveling arms, said grade-signalling means including a detecting device connected to the follower device for developing a signal and relay means connected to the power-operated means for delaying energization thereof following said signal.]

[2. The combination of claim 1 including gravity-operated switch means connected to the power-operated means for energization thereof in response to relative displacement of said leveling arms and switch-mounting means for pivotally adjusting the position of the switch means relative to the leveling arms.]

3. [The combination of claim 2 wherein] *In combination with a paving machine having a screed vertically positioned by leveling arms in accordance with changes in grade determined by a gradeline extending taut between grade rods substantially parallel to the direction of movement of the paving machine, a control system for varying the position of the screed in response to changes in grade and slope including power-operated means connected to the leveling arms for vertical and pivotal displacement of the screed, a follower device pivotally supported by at least one of the leveling arms about a pivotal axis transverse to the direction of movement of the paving machine for contact with the gradeline, and grade-signalling means for energizing the power-operated means in response to pivotal displacement of the follower device by the gradeline relative to the leveling arms, said grade-signalling means including a detecting device connected to the follower device for developing a signal and relay means connected to the power-operated means, for delaying energization thereof following said signal, said control system including gravity-operated switch means connected to the power-operated means for energization thereof in response to relative displacement of said leveling arms and switch-mounting means for pivotally adjusting the position of the switch means relative to the leveling arms, and* said power-operated means [includes] *including* solenoid valve-controlled fluid piston device pivotally mounted to each of the leveling arms, a fixed pivot assembly slidably and pivotally supporting each of the leveling arms, a lever member pivotally mounted by the pivot assembly and connected to the piston device and a link element interconnecting the lever member and each of the leveling arms.

4. The combination of claim 3 wherein said follower device comprises an elongated housing fixed to said one of the leveling arms, angularly adjustable bracket means secured to said housing, a follower lever pivotally mounted by the bracket about said pivotal axis, a follower contact pivotally mounted by the lever about a substantially vertical axis in close lateral spaced relation to the gradeline, torsion spring means biasing the follower contact to a position engaging the gradeline, and means connected to the follower contact for preventing pivotal movement thereof below the grade line in response to displacement of the follower contact by a grade rod out of contact with the gradeline.

5. The combination of claim 4 wherein the switch-mounting means includes a supporting arm pivotally mounted by the leveling arms below the gravity-operated switch means, and remotely controlled drive means operatively connected to the switch means for incremental displacement thereof in opposite directions.

[6. The combination of claim 2 wherein the switch mounting means includes a supporting arm pivotally mounted by the leveling arms below the gravity-operated switch means, and remotely controlled drive means operatively connected to the switch means for incremental displacement thereof in opposite directions.]

7. [The combination of claim 1 wherein] *In combination with a paving machine having a screed vertically positioned by leveling arms in accordance with changes in grade determined by a gradeline extending taut between grade rods substantially parallel to the direction of movement of the paving machine, a control system for varying the position of the screed in response to changes in grade and slope including power-operated means connected to the leveling arms for vertical and pivotal displacement of the screed, a follower device pivotally supported by at least one of the leveling arms about a pivotal axis transverse to the direction of movement of the paving machine for contract with the gradeline, and grade-signalling means for energizing the power-operated means in response to pivotal displacement of the follower device by the gradeline relative to the leveling arms, said grade-signalling means including a detecting device connected to the follower device for developing a signal and relay means connected to the power-operated means for delaying energization thereof following said signal,* said power-operated means [includes] *including* solenoid valve-controlled fluid piston device pivotally mounted by each of the leveling arms, a fixed pivot assembly slidably and pivotally supporting each of the leveling arms, a lever member pivotally mounted by the pivot assembly and connected to the piston device and a link element interconnecting the lever member and each of the leveling arms.

8. The combination of claim 7 wherein said follower device comprises an elongated housing fixed to said one of the leveling arms, angularly adjustable bracket means secured to said housing, a follower lever pivotally mounted by the bracket about said pivotal axis, a follower contact pivotally mounted by the lever about a substantially vertical axis in close lateral spaced relation to the gradeline, torsion spring means biasing the follower contact to a position engaging the gradeline, and means connected to the follower contact for preventing pivotal movement thereof below the gradeline in response to displacement of the follower contact by a grade rod out of contact with the gradeline.

9. [The combination of claim 1 wherein] *In combination with a paving machine having a screed vertically positioned by leveling arms in accordance with changes in grade determined by a gradeline extending taut between grade rods substantially parallel to the direction of movement of the paving machine, a control system for varying the position of the screed in response to changes in grade and slope including power-operated means connected to the leveling arms for vertical and pivotal displacement of the screed, a follower device pivotally supported by at least one of the leveling arms about a pivotal axis transverse to the direction of movement of the paving machine for contact with the gradeline, and grade-signalling means for energizing the power-operated means in response to pivotal displacement of the follower device by the grade-line relative to the leveling arms, said grade-signalling means including a detecting device connected to the follower device for developing a signal and relay means connected to the power-operated means for delaying energization thereof following said signal,* said follower device [comprises] *comprising* an elongated housing fixed to said one of the leveling arms and displaceable therewith relative to the other of the leveling arms, angularly adjustable bracket means secured to said housing, a follower lever pivotally mounted by the bracket about said pivotal axis, follower contact pivotally mounted by the lever about a substantially vertical axis in close lateral spaced relation to the gradeline, torsion spring means biasing the follower contact to a position engaging the gradeline, and means connected to the follower contact for preventing pivotal movement thereof below the gradeline in response to displacement of the follower contact by a grade rod out of contact with the gradeline.

10. The combination of claim 9 including gravity-operated switch means connected to the power-operated means for energization thereof in response to changes in slope of said pivotal axis of the follower device and switch-mounting means for pivotally adjusting the position of the switch means relative to the leveling arms.

11. In combination with a paving machine having a screed vertically positioned by leveling arms in accordance with changes in grade determined by a gradeline extending taut between grade rods substantially parallel to the direction of movement of the paving machine, a follower device pivotally supported by at least one of said leveling arms comprising an elongated housing fixed to said one of the leveling arms, angularly adjustable bracket means secured to said housing, a follower lever pivotally mounted by the bracket about a pivotal axis, a follower contact pivotally mounted by the lever about a substantially vertical axis in close lateral spaced relation to the gradeline, torsion spring means biasing the follower contact to a position engaging the gradeline means connected to the follower contact for preventing pivotal movement thereof below the gradeline in response to displacement of the follower contact by a grade rod out of contact with the gradeline and switch means actuated by the follower lever for vertically adjusting one of the leveling arms.

12. In combination with a paving machine having a screed vertically positioned by leveling arms in accordance with changes in grade determined by a gradeline extending taut between grade rods substantially parallel to the direction of movement of the paving machine, a control system for varying the position of the screed in response to changes in grade and slope including power-operated means connected to the leveling arms for vertical and pivotal displacement of the screed, a follower device pivotally supported by at least one of the leveling arms about a pivotal axis transverse to the direction of movement of the paving machine for contact with the gradeline, grade-signalling means connected to the follower device for energizing the power-operated means to change the position of one of the leveling arms, and gravity-operated switch means connected to the power-operated means for changing the position of the other leveling arm in response to changes in slope of said pivotal axis of the follower device, said follower device comprising an elongated housing fixed to said one of the leveling arms, angularly adjustable bracket means secured to said housing, a follower lever pivotally mounted by the bracket about said pivotal axis, and a follower contact pivotally mounted by the lever about a substantially vertical axis.

13. The combination of claim 12 wherein said grade-signalling means comprises a casing mounted by the bracket means in an angularly adjusted position about the pivotal axis, a cam actuator connected to the follower level, and a pair of signal-establishing switches engageable by the cam actuator.

[14. In combination with a paving machine having a screed vertically positioned by leveling arms in accordance with changes in grade determined by a gradeline extending taut between grade rods substantially parallel to the direction of movement of the paving machine, a control system for varying the position of the screed in response to changes in grade and slope including power-operated means connected to the leveling arms for vertical and pivotal displacement of the screed, a follower device pivotally supported by at least one of the leveling arms about a pivotal axis transverse to the direction of movement of the paving machine for contact with the gradeline, and grade-signalling means connected to the follower device for energizing the power-operated means in delayed response to pivotal displacement of the follower device by a gradeline relative to the leveling arms, said grade-signalling means comprising a casing mounted by said one of the leveling arms in an angularly adjusted position about the pivotal axis, a cam actuator connected to the follower device, a pair of signal-establishing switches engageable by the cam actuator, and time delay relay means electrically connecting the switches to the power-operated means for energizing the same.]

15. [The combination of claim 14 wherein] *In combination with a paving machine having a screed vertically positioned by leveling arms in accordance with changes in grade determined by a gradeline extending taut between grade rods substantially parallel to the direction of movement of the paving machine, a control system for varying the position of the screed in response to changes in grade and slope including power-operated means connected to the leveling arms for vertical and pivotal displacement of the screed, a follower device pivotally supported by at least one of the leveling arms about a pivotal axis transverse to the direction of movement of the paving machine for contact with the gradeline, and grade-signalling means connected to the follower device for energizing the power-operated means in delayed response to pivotal displacement of the follower device by the gradeline relative to the leveling arms, said grade-signalling means comprising a casing mounted by said one of the leveling arms in an angularly adjusted position about the pivotal axis, a cam actuator connected to the follower device, a pair of signal-establishing switches engageable by the cam actuator, and time delay relay means electrically connecting the switches to the power-operated means for energizing the same,* said follower device [comprises] *comprising* an elongated housing enclosing the time delay relay means and fixed to said one of the leveling arms, angularly adjustable bracket means secured to said housing, a follower lever pivotally mounted by the bracket about said pivotal axis, a follower contact pivotally mounted by the lever about a substantially vertical axis in close lateral spaced relation to the gradeline, torsion spring means biasing the follower contact to a position engaging the gradeline, and means connected to the follower contact for preventing pivotal movement thereof below the gradeline in response to displacement of the follower contact by a grade rod out of contact with the gradeline.

[16. In a paving machine having a pair of screed-leveling arms pivotally interconnected by a transverse beam and power-operated means for adjusting the positions of the leveling arms, grade-sensing means mounted by one of the leveling arms for developing a signal in response to variation in grade, signal control means connected to the power-operated means for adjusting the position of said one of the leveling arms in delayed response to said signal and angle-sensing means mounted on the transverse beam and connected to the power-operated means for adjusting the position of the other of the leveling arms to maintain a preset lateral tilt of the beam.]

*17. A control system for mounting on a road-making machine which has an element positioned by power-operated means for forming a road surface at a desired grade in accordance with a grade line extending taut between grade rods substantially parallel to the direction of movement of the machine; said control system comprising a support for attachment to said machine, said support carrying follower means adapted to be carried by the machine for pivoting about a horizontal pivotal axis transverse to the direction of movement of the machine for contact with the grade line, and grade-signalling means actuated by said follower means to energize the power-operated means thereby to change the position of said element, said follower means including a follower lever pivotally mounted for rotation about said horizontal pivotal axis and a contact pivotally mounted on said follower lever for rotation about a substantially vertical axis, said follower contact being rotatable about said vertical axis upon engagement with a grade rod as said machine moves forwardly thereby to permit said follower contact to swing clear of the grade rod.*

*18. A control system as set forth in claim 17 wherein said follower means further includes means for counterbalancing said follower lever on said horizontal pivotal axis so as to maintain said follower contact in contact with said grade line as the machine moves forwardly parallel to the grade line and as the vertical distance between said horizontal pivotal axis and the grade line varies.*

*19. A control system as set forth in claim 17 wherein said follower means further includes spring means biasing said follower contact for rotation about said vertical axis to a position in which it is engageable with the grade line.*

*20. A control system as set forth in claim 17 wherein said follower contact is a generally horizontal member and is adapted for contact with one side of the grade line, and said follower means includes means for preventing said follower contact from moving to the opposite side of the grade line from said one side when the follower contact engages a grade rod and rotates about said vertical axis clear of said grade rod.*

*21. A control system as set forth in claim 20 wherein said means for preventing movement of said follower contact from said one side of the grade line comprises an arm carried by said lever, said arm being rotatable with said follower contact about said vertical axis so that said arm is swung into position for contact with said one surface of the grade line as said follower contact is swung clear of a grade rod thereby to prevent said follower contact from moving to said opposite side of the grade line.*

*22. A control system as set forth in claim 17 wherein said grade signalling means comprises means for detecting rotation of said follower lever and for generating a signal in response thereto indicating a change in grade.*

*23. A control system as set forth in claim 22 wherein said detecting means comprises a cam actuator connected to the follower lever for rotation therewith about said horizontal pivotal axis, and switch means actuable in response to rotation of the cam actuator for generating said signal.*

*24. A control system as set forth in claim 22 wherein said grade signalling means further includes means for delaying energization of said power operated means following generation of said signal.*

*25. A control system as set forth in claim 17 further comprising slope control means operable to effect actuation of said power-operated means for positioning said element so as to form said road surface at a desired slope transversely of the direction of movement of the machine and at said desired grade.*

*26. A control system as set forth in claim 17 in which said follower means is an angularly adjustable bracket.*

*27. In combination with a paving machine having a screed extending transversely of the direction of movement of the machine, power-operated means for positioning said screed so as to form a road surface, said power-operated means comprising a pair of leveling arms, one on each side of the machine, each of said leveling arms being connected at one end to a respective outer end of the screed, and means for connecting the other end of each of said leveling arms to the machine, said connecting means comprising a pivot fixed relative to the machine with said other end of the leveling arm being slidably and pivotally movable relative thereto, a lever member carried by each pivot, a link element interconnecting each member and said leveling arm, and a hydraulic*

*cylinder unit interconnected between said leveling arm intermediate its ends and said lever member whereby actuation of said hydraulic cylinder unit effects movement of its respective leveling arm relative to said pivot thereby to vary the position of the end of the screed connected thereto.*

*28. In combination with a paving machine as set forth in claim 27 wherein each of said hydraulic cylinder units has a solenoid valve for controlling operation of the hydraulic cylinder unit, and said paving machine has control means for forming said road surface at a desired grade and slope, said control means including grade-signalling means for energization of said power-operated means in response to vertical movement of the machine relative to a grade reference and slope control means operable to maintain said road surface at a desired slope transverse of the direction of travel of the paving machine, one of said solenoid valves being responsive to said grade-signalling means thereby to effect movement of one of said leveling arms to maintain said road surface at said desired grade, the other of said solenoid valves being responsive to said slope control means thereby to effect movement of the other of said leveling arms so as to vary the position of the end of the screed connected to said other leveling arm and to maintain said road surface at a desired slope.*

*29. Apparatus for generating a signal in response to a change in position of an element of a road-making machine, such as a change in grade of a screed of an asphalt paver or the like, comprising a cam rotary in response to a change in position of said element, and switch means including two contact assemblies operable in response to rotation of said cam thereby to generate said signal, said cam having two cam surface contours, one for each contact assembly, each contact assembly comprising a pair of elongate flexible resilient cantilever contact arms, with one of each pair of arms constituting a movable contact arm having cam follower means intermediate its ends in resilient engagement with the cam surface of said cam and being movable in and out relative to the rotary axis of said cam by said cam contours in response to rotation of the cam and with the other of said arms of each said pair being normally spaced from its respective movable contact arm and contact means including a first contact carried by said movable arm and a second contact carried by said other contact arm engageable by said first contact*

*as said movable arm moves in response to rotation of said cam, each said contact assembly being so positioned relative to the cam and said cam contours being so developed and phased that with said element in its desired position the contacts of both said contact assemblies are open, and upon movement of said element to a position other than its desired position, rotation of said cam in one direction or the other is effected thereby to close the contacts of one of said contact assemblies while the contacts of the other of said contact assemblies remain open thereby to generate said signal indicating the change in position of said element, said apparatus further comprising means for selectively adjusting the position of each said second contact relative to its respective movable contact thereby selectively to vary the angular position of said cam at which said contacts of each contact assembly open and close thus to vary the sensitivity of the apparatus to detecting a change in position of said element, said selective adjusting means comprising an adjustment screw operable to flex the outer end portion of each other contact arm in and out relative to its respective movable contact thereby to vary the angular position at which said second and movable contacts make and break.*

References Cited

The following references, cited by the Examiner, are of record in the patented file of this patent or the original patent.

UNITED STATES PATENTS

| | | | |
|---|---|---|---|
| 2,922,345 | 1/1960 | Mentes | 404—84 |
| 3,155,020 | 11/1964 | Gurries | 404—84 |
| 3,210,710 | 10/1965 | Amos | 404—84 X |
| 3,111,070 | 11/1963 | Pollitz | 404—84 |
| 3,247,771 | 4/1966 | Hanson | 404—84 |
| 2,491,275 | 12/1949 | Millikin | 404—84 |
| 2,846,635 | 8/1958 | Shea | 404—84 X |
| 3,334,560 | 8/1967 | Long | 404—84 |
| 3,285,148 | 11/1966 | Munyon | 404—84 |
| 3,519,770 | 7/1970 | Long | 404—84 X |
| 3,181,441 | 5/1965 | Flom | 404—84 |

NILE C. BYERS, JR., Primary Examiner

U.S. Cl. X.R.

37—Dig. 20

UNITED STATES PATENT OFFICE

CERTIFICATE OF CORRECTION

PATENT NO. : Re. 28,400

DATED : April 29, 1975

INVENTOR(S) : Luther B. Burgin

It is certified that error appears in the above-identified patent and that said Letters Patent are hereby corrected as shown below:

Column 4, line 29, "strong" should read -- string --. Column 6, line 21, "cam 16" should read -- cam 116 --. Column 8, line 11, "praving" should read -- paving --; line 16, "piovtally" should read -- pivotally --; line 58, "solenoid" should read -- a solenoid --. Column 9, line 36, "solenoid" should read -- a solenoid --. Column 11, lines 72-73, "adapted to be carried by the machine" should have been cancelled.

Signed and Sealed this

*eleventh* Day of *November 1975*

[SEAL]

*Attest:*

RUTH C. MASON
*Attesting Officer*

C. MARSHALL DANN
*Commissioner of Patents and Trademarks*